US009554248B2

(12) United States Patent
Petersen

(10) Patent No.: US 9,554,248 B2
(45) Date of Patent: Jan. 24, 2017

(54) MUSIC DIARY PROCESSOR

(75) Inventor: Steven L. Petersen, Los Gatos, CA (US)

(73) Assignee: Waldeck Technology, LLC, Wilmington, DE (US)

( * ) Notice: Subject to any disclaimer, the term of this patent is extended or adjusted under 35 U.S.C. 154(b) by 2067 days.

(21) Appl. No.: 12/485,082

(22) Filed: Jun. 16, 2009

(65) Prior Publication Data

US 2010/0198880 A1 Aug. 5, 2010

Related U.S. Application Data

(60) Provisional application No. 61/149,205, filed on Feb. 2, 2009.

(51) Int. Cl.

| | |
|---|---|
| ***G06F 7/00*** | (2006.01) |
| ***G06F 17/30*** | (2006.01) |
| ***H04W 4/02*** | (2009.01) |
| ***H04H 20/57*** | (2008.01) |
| ***H04H 20/61*** | (2008.01) |
| ***H04H 20/91*** | (2008.01) |
| ***H04H 60/53*** | (2008.01) |

(Continued)

(52) U.S. Cl.
CPC ............. *H04W 4/023* (2013.01); *H04H 20/57* (2013.01); *H04H 20/61* (2013.01); *H04H 20/91* (2013.01); *H04H 60/53* (2013.01); *H04W 4/003* (2013.01); *H04W 4/028* (2013.01); *H04H 60/51* (2013.01)

(58) Field of Classification Search
CPC ........ H04H 60/53; H04H 20/57; H04H 20/61; H04H 20/91
USPC .................................................. 707/708, 769
See application file for complete search history.

(56) References Cited

U.S. PATENT DOCUMENTS

| | | | |
|---|---|---|---|
| 5,568,645 A | 10/1996 | Morris et al. | |
| 5,760,917 A | 6/1998 | Sheridan | |
| 5,808,612 A * | 9/1998 | Merrick et al. | 715/775 |

(Continued)

FOREIGN PATENT DOCUMENTS

| | | |
|---|---|---|
| EP | 1323318 B1 | 12/2010 |
| EP | 2312871 A1 | 4/2011 |

(Continued)

OTHER PUBLICATIONS

"AllofMe—Timeline yourself," http://www.allofme.com/, printed Apr. 16, 2009, 1 page.

(Continued)

*Primary Examiner* — Daniel Kuddus

(57) ABSTRACT

A music diary processor for generating an electronic music diary. The music diary processor receives a plurality of event identifiers from a user, wherein each event identifier identifies a respective life event associated with the user. The user can also provide a date identifier identifying a date associated with the life event, a song identifier identifying one or more songs identified by the user as being associated with the live event. The event identifiers, song identifiers and the date identifiers are stored in an electronic storage medium wherein each song identifier and date identifier is coupled with at least one respective event identifier, and a plurality of event identifiers are coupled with each other. The music diary processor can serve as a music discovery vehicle, wherein the music diary processor can use data entered by a user to locate songs and other data associated with other music diaries.

4 Claims, 13 Drawing Sheets

A
RECEIVE FRIEND DATA FROM USER DEVICE 300
QUERY MUSIC DIARY DATABASE FOR EVENTS ASSOCIATED WITH FRIENDS 302
FILTER RESULT SET BY DATE/TIME RANGE BASED ON DATE DATA ASSOCIATED WITH EVENT 304
MATCHING EVENTS FOUND? 306
NO
YES
QUERY MUSIC DIARY DATABASE FOR SONGS ASSOCIATED WITH EVENTS 308
SONGS FOUND? 310
YES
ADD SONGS TO SONG LIST 312
NO
B

(51) Int. Cl.
*H04W 4/00* (2009.01)
*H04H 60/51* (2008.01)

(56) References Cited

U.S. PATENT DOCUMENTS 6,195,654 B1 2/2001 Wachtel
6,480,885 B1 11/2002 Olivier
6,549,768 B1 4/2003 Fraccaroli
6,578,072 B2 6/2003 Watanabe et al.
6,618,593 B1 9/2003 Drutman et al.
6,654,786 B1 11/2003 Fox et al.
6,662,231 B1 12/2003 Drosset et al.
6,895,084 B1 * 5/2005 Saylor et al. .............. 379/88.22
6,941,324 B2 9/2005 Plastina et al.
7,047,030 B2 * 5/2006 Forsyth ......................... 455/518
7,072,886 B2 7/2006 Salmenkaita et al.
7,080,139 B1 7/2006 Briggs et al.
7,096,234 B2 8/2006 Plastina et al.
7,296,032 B1 11/2007 Beddow
7,366,522 B2 4/2008 Thomas
7,509,291 B2 3/2009 McBride et al.
7,644,166 B2 1/2010 Appelman et al.
RE41,450 E 7/2010 Briggs et al.
7,761,399 B2 7/2010 Evans
7,818,215 B2 * 10/2010 King et al. ................... 705/26.1
7,869,591 B1 * 1/2011 Nagel et al. .................... 380/28
8,195,499 B2 * 6/2012 Angell et al. ................ 705/7.29
2001/0036224 A1 11/2001 Demello et al.
2002/0049686 A1 4/2002 Chuang et al.
2002/0052925 A1 5/2002 Kim et al.
2002/0087382 A1 7/2002 Tiburcio
2002/0087496 A1 7/2002 Stirpe et al.
2002/0144259 A1 10/2002 Gutta et al.
2002/0174426 A1 11/2002 Gutta et al.
2003/0018799 A1 1/2003 Eyal
2003/0054810 A1 3/2003 Chen et al.
2003/0147624 A1 8/2003 Trajkovic et al.
2003/0225836 A1 12/2003 Lee et al.
2004/0088271 A1 5/2004 Cleckler
2004/0088355 A1 5/2004 Hagan et al.
2004/0091235 A1 5/2004 Gutta
2004/0093340 A1 * 5/2004 Edmondson et al. ........ 707/101
2004/0215793 A1 10/2004 Ryan et al.
2004/0260778 A1 12/2004 Banister et al.
2005/0131866 A1 6/2005 Badros
2005/0154764 A1 7/2005 Riegler et al.
2005/0256866 A1 11/2005 Lu et al.
2006/0015580 A1 * 1/2006 Gabriel et al. ................ 709/219
2006/0053080 A1 3/2006 Edmonson et al.
2006/0130120 A1 6/2006 Brandyberry et al.
2006/0282304 A1 12/2006 Bedard et al.
2006/0282776 A1 12/2006 Farmer et al.
2006/0293909 A1 12/2006 Miyajima et al.
2007/0014536 A1 1/2007 Hellman
2007/0028171 A1 2/2007 MacLaurin
2007/0064626 A1 3/2007 Evans
2007/0083929 A1 4/2007 Sprosts et al.
2007/0106672 A1 5/2007 Sighart et al.
2007/0130008 A1 6/2007 Brown et al.
2007/0155416 A1 7/2007 Donnellan
2007/0192717 A1 8/2007 Gong et al.
2007/0214259 A1 9/2007 Ahmed et al.
2007/0219983 A1 * 9/2007 Fish ................................. 707/5
2007/0233736 A1 10/2007 Xiong et al.
2007/0238427 A1 10/2007 Kraft et al.
2007/0245245 A1 10/2007 Blue et al.
2007/0264982 A1 11/2007 Nguyen et al.
2007/0300260 A1 12/2007 Holm et al.
2008/0005179 A1 1/2008 Friedman et al.
2008/0005688 A1 1/2008 Najdenovski
2008/0016098 A1 1/2008 Frieden et al.
2008/0033959 A1 2/2008 Jones
2008/0052630 A1 2/2008 Rosenbaum
2008/0055427 A1 3/2008 Wendelrup
2008/0141136 A1 6/2008 Ozzie et al.
2008/0175103 A1 7/2008 Nakamura et al.
2008/0189336 A1 8/2008 Prihodko
2008/0189655 A1 8/2008 Kol
2008/0195664 A1 8/2008 Maharajh et al.
2008/0209448 A1 * 8/2008 Ayres et al. .................. 719/321
2008/0219252 A1 * 9/2008 Narasimhaprasad ......... 370/389
2008/0235632 A1 9/2008 Holmes
2008/0244681 A1 10/2008 Gossweiler et al.
2008/0276279 A1 11/2008 Gossweiler et al.
2008/0288588 A1 11/2008 Andam et al.
2008/0306826 A1 12/2008 Kramer et al.
2008/0313084 A1 * 12/2008 Socolofsky ..................... 705/52
2008/0313541 A1 12/2008 Shafton et al.
2009/0069911 A1 3/2009 Stefik
2009/0069912 A1 3/2009 Stefik
2009/0070350 A1 3/2009 Wang
2009/0077124 A1 3/2009 Spivack et al.
2009/0106082 A1 * 4/2009 Senti et al. ..................... 705/10
2009/0111438 A1 4/2009 Chan
2009/0125588 A1 5/2009 Black et al.
2009/0157613 A1 * 6/2009 Strohmenger et al. ........... 707/3
2009/0164641 A1 6/2009 Rogers et al.
2009/0183091 A1 * 7/2009 Sharpe et al. ................ 715/761

FOREIGN PATENT DOCUMENTS

GB 2435371 A 8/2007
JP 2002-196778 7/2002
JP 2007-011452 1/2007
JP 2008-027042 2/2008
KR 20020007934 A 1/2002
WO 02/21864 A1 3/2002

OTHER PUBLICATIONS

"Crysanth Diary Writing," http://www.netimediary.com/diarysoftware/, copyright Crysanth Software, printed Aug. 17, 2009, 3 pages.
"Apple—iTunes—What is iTunes?—A player, a store, and more," http://www.apple.com/itunes/whatis/, printed Aug. 11, 2009, 2 pages.
"MyStrands—Social Recommendation and Discovery," http://web.archive.org/web/20080212112512/http://mystrands.com/, copyright 2003-2008 Strands, Inc., printed Aug. 17, 2009, 4 pages.
"Lifeblob—Your Life on a Timeline!," http://www.lifeblob.com, copyright 2009 Aetas Tech Pvt Ltd, printed Apr. 16, 2009, 1 page.
"Lifehaps," http://www.lifehaps.com/, copyright 2008 Capital H Creative, printed Apr. 16, 2009, 1 page.
"LinkedIn. Relationships Matter," http://www.linkedin.com/, copyright 2009 LinkedIn Corporation, printed Jan. 22, 2009, 1 page.
"WQLJ," http://web.archive.org/web/20060206153422/http://209.41.184.28/radio_tool.cfm?pnpid=5 . . . , printed Aug. 17, 2009, 1 page.
Martin Rebas, "Music Diary," http://www.rebas.se/aboutme/musicdiary.shtml, printed Aug. 17, 2009, 7 pages.
"Rhapsody Unlimited," http://learn.rhapsody.com/plans/unlimited?src=rcom_acctcrt_uld&pcode=rn, copyright 2001-2008 Listen.com, printed Aug. 13, 2009, 1 page.
"UltraTech-Software.com—High Quality Software @ Affordable Prices. Why pay more?," http://www.ultratech-software.com/ultradiary.html, copyright 2006 UltraTech-Software.com, printed Apr. 16, 2009, 2 pages.
"About uPlayMe," at <http://www.uplayme.com/about.php>, copyright 2008, uPlayMe, Inc., 4 pages.
Abstract, Japanese Patent Publication No. 2002-196778, published Jul. 12, 2002, "Information Reproducing Apparatus with Reproduction Function Giving Priority to History," Japanese Patent Application No. 2000-392591, filed Dec. 25, 2000, Applicant: Kenwood Corp, Inventor: Negi Takeshi, obtained from Patent Abstracts of Japan, printed Nov. 29, 2011, 1 page.
Abstract, Japanese Patent Publication No. 2007-011452, published Jan. 18, 2007, "Program, Data Processing Method, Data Processor, Audio Reproducing Apparatus," Japanese Patent Application No.

(56) References Cited

OTHER PUBLICATIONS 2005-188058, filed Jun. 28, 2005, Applicant: Sony Corp, Inventor: Matsuda Koichi, obtained from Patent Abstracts of Japan, printed Nov. 29, 2011, 1 page.

Abstract, Japanese Patent Publication No. 2008-027042, published Feb. 7, 2008, "Automatic Blog Generation System, Automatic Blog Generation Method, and Program," Japanese Patent Application No. 2006-196882, filed Jul. 19, 2006, Applicant: NEC Corp, Inventor: Arimitsu Kazuhiro, obtained from Patent Abstracts of Japan, printed Nov. 29, 2011, 1 page.

Abstract, Korean Patent Publication No. 20020007934, published Jan. 29, 2002, "Electronic Album System for Wire/Wireless Internet Diary," Korean Patent Application No. 20000042073, filed Jul. 19, 2000, Applicant/Inventor: Park Jong Deuk, obtained from www.espacenet.com, printed Nov. 29, 2011, 1 page.

"Last.fm—The Social Music Revolution," at <http://www.last.fm/>, printed Feb. 7, 2007, 1 page.

"musicstrands.com—Because Music is Social," brochure, copyright 2006, MusicStrands, Inc., 2 pages.

"Start Listening with Last.fm," at <http://www.last.fm/>, date unknown, 1 page.

"uPlayMe.com Meet People, Music Sharing—Home," at <http://www.uplayme.com/>, copyright 2008, uPlayMe, Inc., printed Mar. 26, 2009, 1 page.

* cited by examiner

100

| METHOD | WEIGHT FACTOR |
|---|---|
| EXACT EVENT MATCH | 8 |
| IMPLICIT MATCH VIA FRIENDS | 4 |
| IMPLICIT MATCH BY LOCATION/TIME | 2 |
| IMPLICIT MATCH VIA HISTORICAL DATA | 1 |

*FIG.11*

MUSIC DIARY PROCESSOR

RELATED APPLICATIONS

This application claims the benefit of provisional patent application Ser. No. 61/149,205, filed Feb. 2, 2009, the disclosure of which is hereby incorporated herein by reference in its entirety.

FIELD OF THE INVENTION

This invention relates to music discovery and sharing music, and in particular relates to a music diary processor for generating a music diary of life events associated with a user.

BACKGROUND OF THE INVENTION

People frequently associate, either consciously or subconsciously, music that was played during a past event, such as a high school graduation or a wedding, with one or more particular songs. When an individual hears such a song, even decades later, the individual may immediately recall favorable (or unfavorable) memories about the event. Moreover, as the individual listens to the song, the individual may also begin to remember other songs from the particular era that they enjoyed. People also frequently enjoy sharing aspects of their lives, including the music they listen to, with other individuals. This desire has been realized by a number of popular social networking sites devoted almost entirely to enabling users to share aspects of their lives with friends and other members of the site. As such, there is a need for a mechanism for facilitating music discovery in conjunction with past events and for the mechanism to be implemented in a manner that could be shared with friends, wherein the friends may be exposed to the past events and the music associated therewith.

SUMMARY OF THE INVENTION

The present invention relates to a music diary processor for generating an electronic music diary. The electronic music diary includes event identifiers identifying a plurality of life events of a user, song identifiers identifying one or more songs designated by the user as being associated with a respective life event, and date identifiers identifying a date or date span associated with a respective life event. Each song identifier and date identifier is coupled to an event identifier and is stored in a music diary database on an electronic storage medium. The music diary processor of the present invention may provide the event identifiers, song identifiers, and date identifiers to a user device for display to the user during generation or modification of the music diary, or to other user devices that desire to view or play the music diary of the user.

The music diary processor may be implemented in the context of a service, such as an online social network website, having a user membership. Each user may use the music diary processor to generate a music diary associated with life events of the respective user. Each music diary may be stored in the music diary database and, as described further herein, may be used collectively to generate or update a user's or other users' music diaries.

A music diary may further comprise location identifiers identifying a location of a respective life event, and user identifiers identifying one or more other individuals designated by the user as being associated with the life event. When a first user generates or updates a music diary, the music diary processor may use data relating to a life event of the first user to query the music diary database to obtain data, such as song identifiers or user identifiers, from other users' music diaries, and provide such data to the first user to aid the first user in generating the first user's music diary. For example, the first user may identify a life event having an event identifier of "Livonia High School 1992 Graduation." The music diary processor may query the music diary database to determine whether other life events of other users have similar or identical event identifiers. If so, the music diary processor may obtain the user identifiers associated with such music diaries and provide the user identifiers to the user device associated with the first user, enabling the first user to designate one or more of the other users as "friends" that should be associated with the life event. The music diary processor may also query the music diary database to obtain song identifiers that have been identified as being associated with the life event by the other users. The music diary processor may provide the song identifiers to the user device for presentation to the first user, who may desire to designate one or more of the song identifiers as being associated with the life event.

The music diary processor may also facilitate commercial transactions between the first user and a media provider, such as a music store or a music subscription service. Upon receiving a request by the first user to associate a song with a life event, the music diary processor may determine whether the first user possesses, or otherwise has rights, to the song. If the first user does not have rights to the song, the music diary processor may facilitate an interaction between the first user and the media provider, and enable the first user to obtain the song for a fee.

The music diary processor may also interact with a historical music repository comprising songs recorded in the past that may not otherwise be readily available in digital format today. For example, such songs may be generated from sources such as radio broadcasts from stations that may broadcast, or in the past have broadcasted, in a geographic area close to the location of the life event, from Music Television (MTV) and VH1 broadcasts, from local concerts, and the like. To the extent the previous broadcasts have date and location information associated therewith, or that information can be determined by cross-referencing broadcast records from sources geographically close to the location of the life event, songs from such previous broadcasts can be digitized and stored in the historical music repository and associated with respective dates and/or locations. Upon receipt of data, such as location identifiers or date identifiers, the music diary processor may query the historical music repository and identify songs based on the location identifiers and/or the date identifiers. Song identifiers identifying the songs can be presented to the first user for association by the first user with the respective life event. Upon selection of a song by the first user, the first user may be presented with an opportunity to purchase the song from the historical music repository.

The music diary processor may use one or more filters to reduce the amount of data provided to the first user. The filters may use Gaussian curves to establish boundary lines that define a limited subset of data that may be provided to the first user. The music diary processor may also weight database query results to provide the data to the user device in an order of a determined relevance.

Upon request from the first user, the music database processor may access the music diary associated with a second user and provide the music diary to the user device for display to the first user. The user device can provide the music diary in a user interface that orders life events chronologically, and can display life event data, such as event identifiers, song identifiers, location identifiers, and date identifiers, associated with the life events to the first user. One or more of the identifiers may be provided in a selectable format, such as a hyperlink, that, upon selection by the first user, causes an action to occur. For example, upon selection of a respective song identifier by the first user, the song identified by the song identifier may be accessed and played on the user device associated with the first user. If the first user does not possess or otherwise have rights to the song, a shortened preview of the song may be played and/or the first user may be coupled to a media provider and given an opportunity to purchase the song. The user interface may also enable the first user to play the entire music diary from beginning to end, thus enabling the first user to listen to all the songs in a chronological sequence designated by the second user as being meaningful to the second user.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 11 shows a table illustrating exemplary weight factors that may be used for prioritizing results from a database query.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to a music diary processor for generating an electronic music diary. The electronic music diary can include event identifiers identifying a plurality of life events of a user, song identifiers identifying one or more songs designated by the user as being associated with a respective life event, and date identifiers identifying a date or date span associated with a respective life event.

Figure 1:
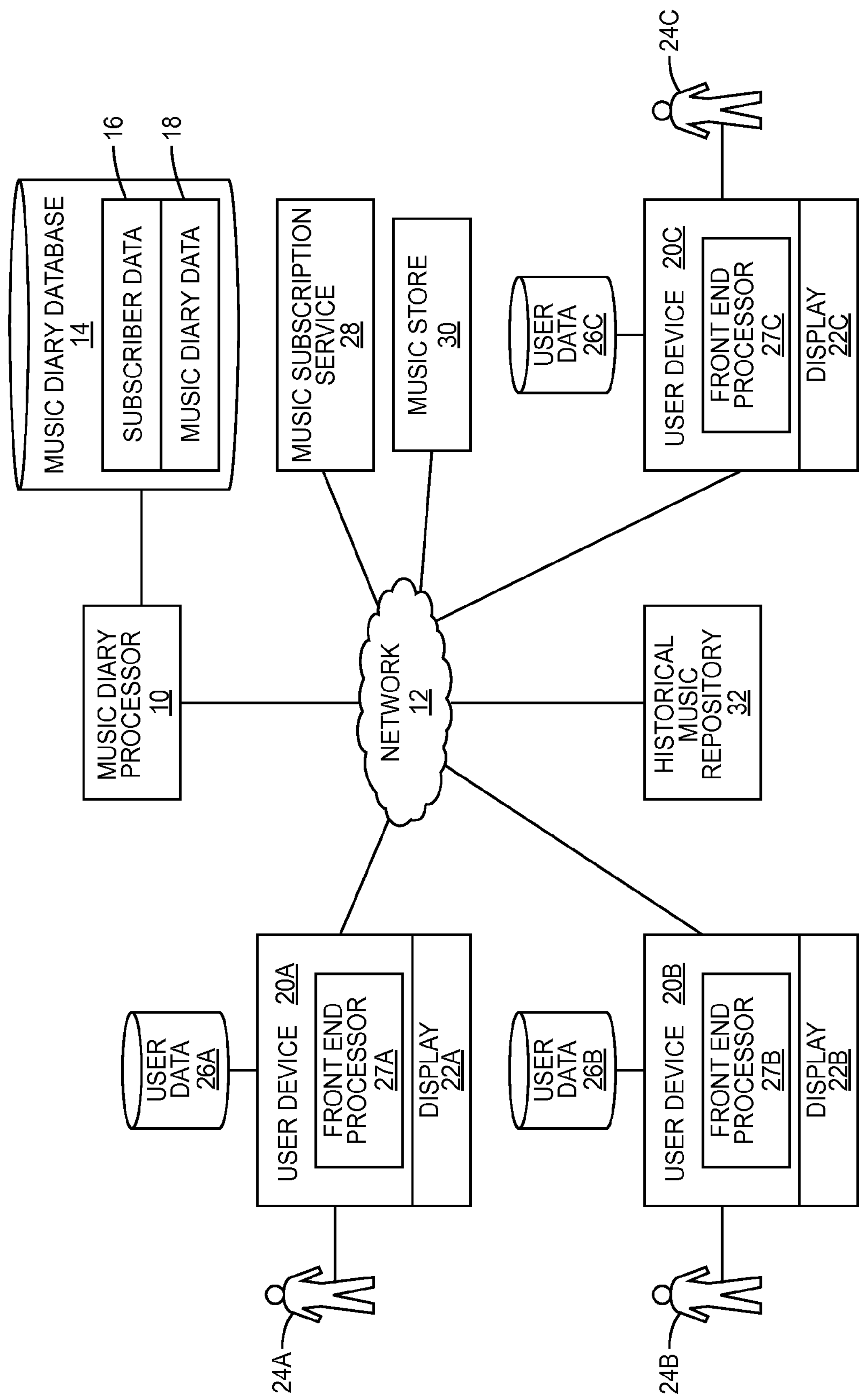
FIG. 1 shows a block diagram illustrating a network and apparatus including an exemplary music diary processor according to one embodiment of the present invention.

FIG. 1 shows a block diagram illustrating a network and apparatus including an exemplary music diary processor according to one embodiment. A music diary processor 10 is coupled to a network 12. The music diary processor 10 has associated therewith an electronic storage medium such as, for example, a music diary database 14. The music diary processor 10 stores data, such as subscriber data 16 and music diary data 18, as further described herein, in the music diary database 14. A plurality of user devices 20, such as user devices 20A, 20B, and 20C, may be coupled to the music diary processor 10 via the network 12.

The network 12 may comprise any combination of proprietary or conventional network technologies and/or network topologies suitable for enabling the music diary processor 10 to communicate with the user devices 20. For example, the network 12 may include one or more of a Wide Area Network (WAN), a wired Local Area Network (LAN), wireless LANs, and local access technologies such as Wi-Fi and Bluetooth. Any suitable communications messaging protocol, such as Transmission Control Protocol/Internet Protocol (TCP/IP), may be used. Each of the user devices 20 preferably has a display 22, such as the displays 22A, 22B, and 22C, suitable for displaying a music diary to a respective user 24. Each user device 20 may also be coupled to user data 26, such as user datas 26A, 26B, and 26C, which may include data such as songs owned by the respective user 24.

In one embodiment, the music diary processor 10 may be implemented as a service provided in the context of a social networking website. The users 24 may be members of the social networking website. The subscriber data 16 in the music diary database 14 may comprise membership information regarding the users 24 including, for example, preference information describing each of the users' 24 preferences relating to music. For example, preference information may include priority indicators that indicate a particular user's 24 preference of a respective song genre, such as pop, relative to a number of other genres; a respective recording decade, such as the 1990s, relative to other decades in which a song was recorded; or a respective artist, relative to other artists' songs. It will be apparent to those skilled in the art that these preferences are merely exemplary, and preferences associated with a user 24 can comprise any information that may be useful in determining types of music a user 24 may prefer over other types of music.

While for purposes of illustration the invention herein will be described in the context of an electronic music diary wherein songs are coupled with life events, it will be apparent to those skilled in the art that the teachings disclosed herein may be used to generate other types of electronic media diaries, such as video diaries. Throughout the Specification wherein similar elements are referred to by the same numeric reference characters and are distinguished by alphabetic reference characters, such as the user devices 20A, 20B, and 20C, such elements may be referred to collectively with reference only to the numeric reference characters, such as the user devices 20, where the discussion pertains to one or more of such elements equally.

According to one embodiment, a user 24 may interact with the music diary processor 10, as described in greater detail herein, to generate a music diary that is stored in the music diary database 14. The music diary includes information about life events of the user 24. Life events may comprise any event that a respective user 24 desires to record in the music diary. A life event may comprise an event that occurs on a particular date, such as a birth date of a user 24, or may comprise a date span that spans a plurality of dates, such as an individual's freshman year in high school.

According to one embodiment, a user 24 interacts with a front end processor 27, such as an application processor or special purpose circuitry, which executes on a respective user device 20. The front end processor 27 interacts with the music diary processor 10 via the network 12. The front end processor 27 may comprise any suitable mechanism adapted to provide data to the user 24 and to communicate with the music diary processor 10. According to one embodiment, the front end processor 27 comprises a web browser that incorporates asynchronous JavaScript and Extensible Markup Language (AJAX) technologies enabling the front end processor 27 to initiate asynchronous Hypertext Transfer Protocol (HTTP) requests to the music diary processor 10, and receive responses back from the music diary processor 10 during data entry by the user 24.

For each life event in the music diary, the user 24 may provide an event identifier that identifies a life event of the user 24. The event identifier may comprise, for example, a textual description of the life event, such as, for example, "1999 Graduation From Glenwood High School." For each such event identifier, the user 24 may also provide a date identifier identifying a date or a date span associated with the respective life event. For example, a date identifier for the above-referenced event identifier may comprise "Jun. 6, 1999." A song identifier identifying a song may also be provided by the user 24 that is selected based on any criteria desired by the user 24, such as, for example, a memory of a particular song from that era of time or one that has a unique significance for that user 24 for that respective life event. The song identifier may identify a respective song or may identify a playlist of songs. The event identifiers, date identifiers, and song identifiers are provided to the music diary processor 10 and are stored in the music diary database 14 as music diary data 18. The music diary processor 10 couples life events with respective song identifiers and date identifiers. In this manner, in response to a request from a user 24 to review the respective user's 24 music diary, or the music diary of another user 24, the music diary processor 10 can retrieve the requested music diary from the music diary database 14 and provide the event identifiers, song identifiers, and date identifiers to the user device 20 for display to the user 24.

As will be described in greater detail herein, the generation of an electronic music diary according to one embodiment serves as a music discovery vehicle. As such, a respective user 24A may provide information via the user device 20A to the music diary processor 10 that enables the music diary processor 10 to obtain music diary data 18 from the music diary database 14, and provide the music diary data 18 to the user device 20A for display to the user 24A. Based on the music diary data 18, the user 24A may decide to associate, or couple, a song identified by the music diary data 18 with a particular life event. The user 24A may already own the song, which may be contained in the user data 26 as part of a music collection, such as an iTunes® music collection. If the user 24A does not own the song, e.g., if the song is not contained in the user data 26, or otherwise have rights to the song, the user 24A may obtain the song from a media provider, such as a music subscription service 28 or a music store 30. The music subscription service 28 may comprise any suitable third party service which, for a fee, enables a user 24 to obtain one or more songs identified by the user 24. Similarly, the music store 30 may comprise any suitable online music store, such as Apple's® iTunes® music store, which upon identification of a respective song may enable the user 24 to download the song from the music store 30 via the network 12 to the user data 26.

According to one embodiment, the music diary processor 10 may be coupled to a historical music repository 32, which may provide access to songs that may have been recorded decades ago via radio broadcasts, MTV broadcasts, and the like. The music diary processor 10 may use date identifiers provided by a user 24A to query the historical music repository 32 for songs that may be suitable for a respective life event, and provide the respective user device 20A with such songs, enabling the user 24A to identify and couple one or more of the songs to a life event. The user 24A may then engage in a commercial transaction with the historical music repository 32 to purchase the rights to the songs.

According to one embodiment, a user 24, such as the user 24A, during generation or modification of a respective electronic music diary, may desire to see a music diary of another user 24, such as the user 24C. The user 24A may input into the user device 20A a user identifier identifying the user 24C, which is provided by the user device 20A via the network 12 to the music diary processor 10. The music diary processor 10 may obtain the electronic music diary associated with the user 24C from the music diary database 14. The music diary data 18 comprising the electronic music diary of the user 24C can be provided via the network 12 to the user device 20A and can be presented for display to the user 24A. The user 24A may play one or more songs from the electronic music diary associated with the user 24C and request that one or more of the songs be coupled to a life event in the music diary of the user 24A. The music diary may include privacy information that limits what the user 24A is able to perceive. For example, the user 24C may designate certain life events as "public," or another suitable designation that enables anyone, including the user 24A, to access the particular life event, and may designate other life events as "private," which may preclude users 24 from viewing the particular life event absent a special designated relationship with the user 24C.

Figure 2:
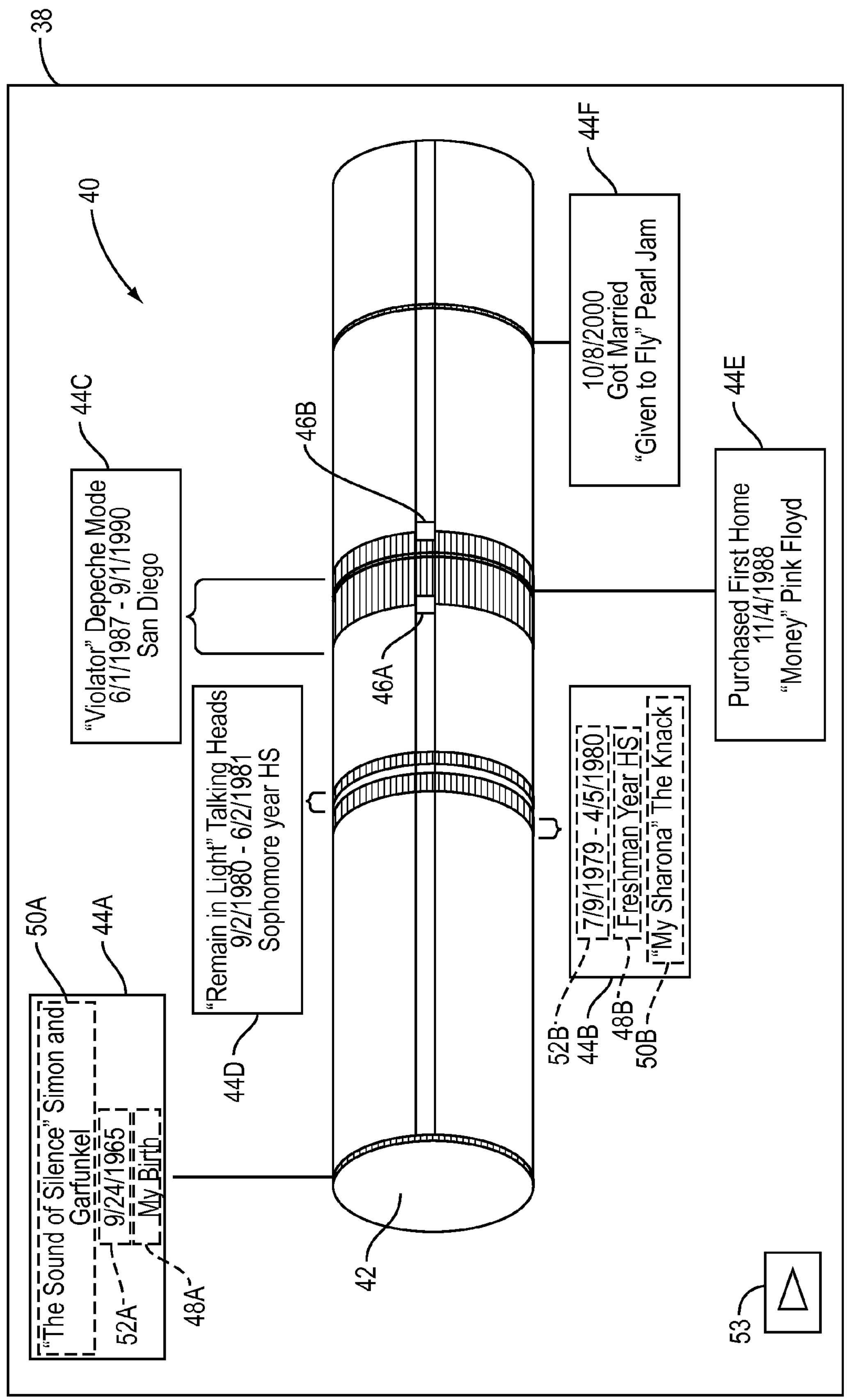
FIG. 2 shows an exemplary electronic music diary displayed in a user interface of a display device.

FIG. 2 shows an exemplary electronic music diary 40 displayed in a user interface 38 on a display 22 (FIG. 1). The electronic music diary 40 comprises a timeline 42 and a plurality of display areas 44A through 44F, wherein each display area 44 includes information associated with a respective life event of a user, such as the user 24A. The electronic music diary 40 depicts six display areas 44 associated with six respective life events, but it will be apparent to those skilled in the art that the electronic music diary 40 may comprise fewer or more display areas 44. The user interface 38 may allow the user 24A to expand or contract a particular portion of the timeline 42, such as via slider bars 46. For example, the user 24A may place the slider bar 46A at a beginning of a decade and place another slider bar 46B at the end of the decade, and then select and expand the slider bars 46 such that an increasing number of display areas 44 within the decade become visible to the user 24A.

Each of the display areas 44 include an event identifier 48, a song identifier 50, and a date identifier 52. For example, the display area 44A includes an event identifier 48A entitled "My Birth." Thus, the life event recorded by the user 24A relates to the birth of the user 24A. The display area 44A also includes a date identifier 52A comprising the date "9/24/1965," indicating that the user 24A was born on Sep. 24, 1965. The display area 44A includes a song identifier 50A entitled "The Sound of Silence" by Simon and Garfunkel. Note that the life event depicted in the display area 44A is associated with a relative position along the timeline 42 via a vertical bar extending from the display area 44A to the timeline 42.

A second display area 44B includes an event identifier 48B entitled "Freshman Year HS," indicating the life event depicted by the display area 44B relates to the freshman year in high school of the user 24A. A song identifier 50B is entitled "My Sharona" by The Knack, indicating that the user 24A has associated the song "My Sharona" with this life event. A date identifier 52B includes a date span extending from "7/9/1979-4/5/1980." The display areas 44C through 44F depict other life events of the user 24A, and include other respective event identifiers 48, song identifiers 50, and date identifiers 52. It will be appreciated by those skilled in the art that the particular depiction of the electronic music diary 40 illustrated in the user interface 38 is only one of many different ways of displaying the life events, event identifiers 48, song identifiers 50, and date identifiers 52 in a chronological manner.

One or more of the identifiers illustrated in the display areas 44 may be selectable by the user 24A. For example, the user 24A may, via a mouse or a keyboard, for example, select a song identifier 50, such as the song identifier 50A. Upon selection of the song identifier 50A, the user device 20A may determine whether the song "The Sound of Silence" is located in the user data 26A and, if not, may initiate a commercial transaction with the music subscription service 28 or the music store 30 wherein the song "The Sound of Silence" is transferred from the media provider to the user device 20A where the song can be stored in the user data 26A. Alternately, the music diary processor 10 may maintain shortened previews of songs that may be provided to the user device 20A upon request and played for a respective user 24 upon selection. Preferably, the electronic music diary 40 can be played sequentially from the beginning of the timeline 42 through the end of the timeline 42 via selection of a play button 53.

Figure 3:
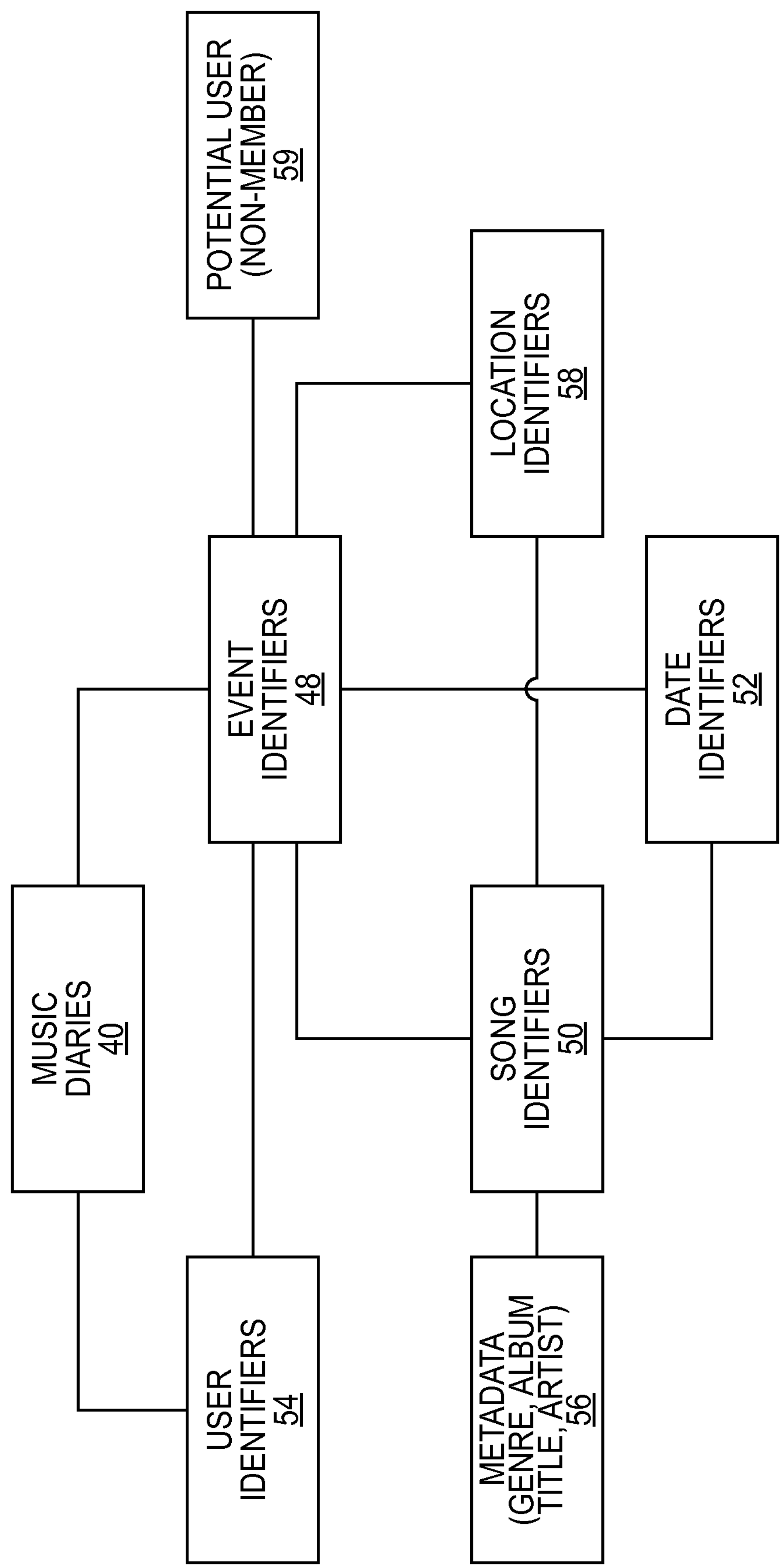
FIG. 3 shows a data diagram illustrating exemplary relationships between information, such as identifiers, that may be stored in the music diary database to aid in a music discovery process.

FIG. 3 shows a data diagram illustrating an exemplary relationship between information that may be stored in the music diary database 14 to aid in a music discovery process. The data diagram illustrates one mechanism for coupling music diary data 18 in a manner that may be used by the music diary processor 10 to find song identifiers 50, and other identifiers, that may be provided to a user 24 during generation of a music diary. For example, given a respective user identifier 54, the music diary processor 10 can determine an electronic music diary 40 associated with the user identifier 54. Given a respective electronic music diary 40, the music diary processor 10 can determine event identifiers 48 associated with the respective electronic music diary 40. Similarly, given a respective event identifier 48, a music diary processor 10 can determine respective song identifiers 50, date identifiers 52, and location identifiers 58. Each song identifier 50 may have metadata 56, such as genre metadata, album title metadata, and artist metadata, associated therewith.

Notably, the music diary processor 10 can be provided information, such as a date identifier 52, and from the date identifier 52 determine song identifiers 50 and event identifiers 48 that may be coupled to the date identifiers 52 in one or more electronic music diaries 40. For example, a user 24 may provide a date identifier 52 associated with a life event being added to a respective electronic music diary 40, and the music diary processor 10 may use one or more of the connections depicted in FIG. 3 to find song identifiers 50 that have been associated with identical date identifiers 52 in the electronic music diaries 40 of other users 24. The music diary processor 10 may present the song identifiers 50 to the respective user device 20 for display to the user 24, wherein the user 24 may select one or more of the songs to associate with the respective life event. In the context of a social networking service, potential user data 59 may identify individuals that have been identified as being present at life events of subscribers, but who are not themselves members of the social networking service. Such information would enable a member to associate non-members with life events, and use such non-members in search criteria against the music diary database 14. Also, if such a potential member ultimately joins the social networking service, the service can automatically generate a music diary database for the new member with certain life events for the member already defined. Those skilled in the art will recognize that the data diagram depicted in FIG. 3 is but one example of how such data can be coupled together, and the invention is not limited thereto. Moreover, those skilled in the art will recognize that the relationship between any two identifiers or data illustrated in FIG. 3 may be one to one, one to many, or many to many, depending on the particular implementation.

Figure 4:
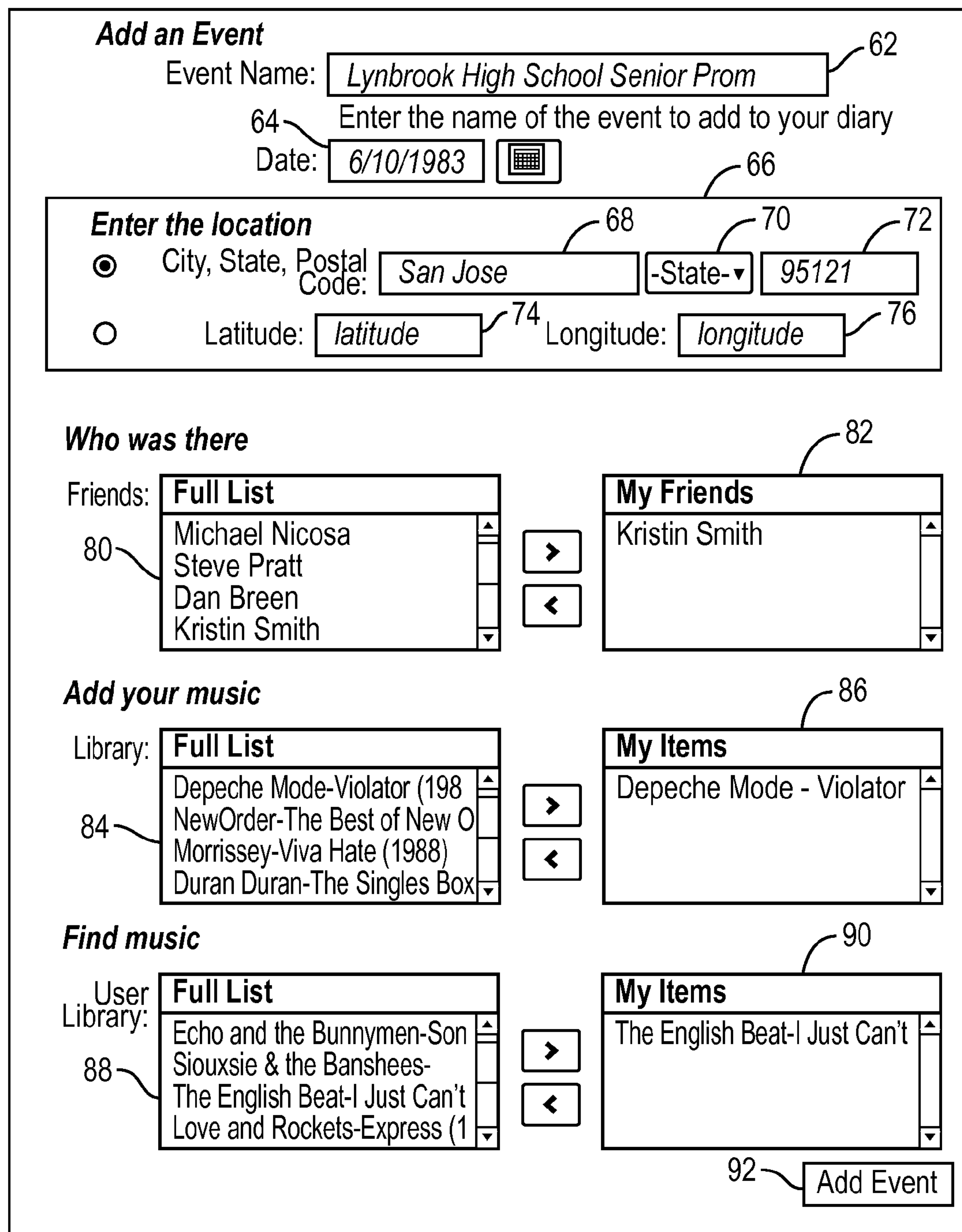
FIG. 4 shows an exemplary user interface suitable for enabling a user to generate or modify an electronic music diary according to one embodiment of the present invention.

FIG. 4 shows an exemplary user interface 60 that may be displayed on a display 22 of a respective user device 20 while a user 24 is generating or modifying an electronic music diary 40. The user 24 may enter into an event identifier field 62 a textual label, or description, of the life event that the user 24 would like to record in the electronic music diary 40. The user 24 may also enter a date or a date span in a date field 64. A location box 66 allows the user 24 to enter the location of the life event in any of several forms, including via a city field 68, a state field 70, a zip code field 72, or via the use of coordinates such as a latitude field 74 and a longitude field 76.

According to one embodiment of the present invention, the user interface 60 may be implemented in a Web 2.0 style front end processor wherein the processor uses AJAX technology to asynchronously communicate with the music diary processor 10 via the network 12 while the user 24 is simultaneously entering data into the user interface 60. Thus, the user interface 60 may provide data entered by the user 24, such as the event identifier information placed in the event identifier field 62, to the music diary processor 10 via the network 12 as the user 24 enters information into the user interface 60. The music diary processor 10 may use such information to obtain data from the music diary database 14 and provide such information to the user device 20, which can then update the user interface 60 for display to the user 24. For example, the user device 20 may provide the event identifier information contained in the event identifier field 62 to the music diary processor 10. The music diary processor 10 may initiate a search of the music diary database 14 to determine if an event identifier of the name "Lynbrook High School Senior Prom," or a name substantially similar to the name exists in an electronic music diary 40 of another user 24 stored in the music diary database 14. If so, the music diary processor 10 may obtain the location information associated with the life event from the electronic music diary 40 and provide the location information to the user device 20, which in turn may use the location information to update the appropriate data field in the location box 66, saving the user 24 time and effort from completing the fields contained in the location box 66.

A friends menu 80 may display all of the known friends of the user 24. The friends displayed in the friends menu 80 may come from any of a variety of sources such as a contacts database on the user device 20, or individuals that have been designated by the user 24 as friends and that are known to the music diary processor 10 and stored in the music diary database 14. In the latter situation, the music diary processor 10 may provide one or more of the friends illustrated in the friends menu 80 to the user device 20 for display to the user 24. The user 24 may select one or more of the friends and indicate that the friends should be associated with the respective life event by moving the friends to a selected friends menu 82. Similarly, a library menu 84 may contain the name of each song in the user's 24 music library. The user's 24 music library may be stored in the user data 26 associated with the user 24. The user 24 may select one or more of the songs and indicate that the songs should be associated with the life event by moving the songs to a selected library menu 86. As will be described in greater detail herein, the music diary processor 10 may discover additional songs and provide the songs to the user device 20 for display in a user library menu 88. The songs may be discovered by the music diary processor 10 based on information provided to the music diary processor 10 by the user device 20 based on information entered or selected by the user 24 in the user interface 60. The user 24 may select one or more songs depicted in the user library menu 88 for association with a respective life event by moving the songs to a selected user library menu 90.

After the user 24 has provided the desired information in the user interface 60, the user 24 can select an add event button 92 such that the user device 20 can communicate such information to the music diary processor 10 and the music diary processor 10 can generate an event identifier 48 from the data provided by the user 24 in the event identifier field 62, a date identifier 52 from the information provided in the date field 64, and one or more song identifiers 50 from the songs selected in the selected library menu 88 and the selected user library menu 90. The music diary processor 10 may also generate a location identifier 58 from the information provided in the location box 66. The music diary processor 10 can couple such information together and store it in the music diary database 14 wherein, upon request, the music diary processor 10 can obtain the information and determine that the information is coupled together and is associated with the respective user 24.

Figure 5:
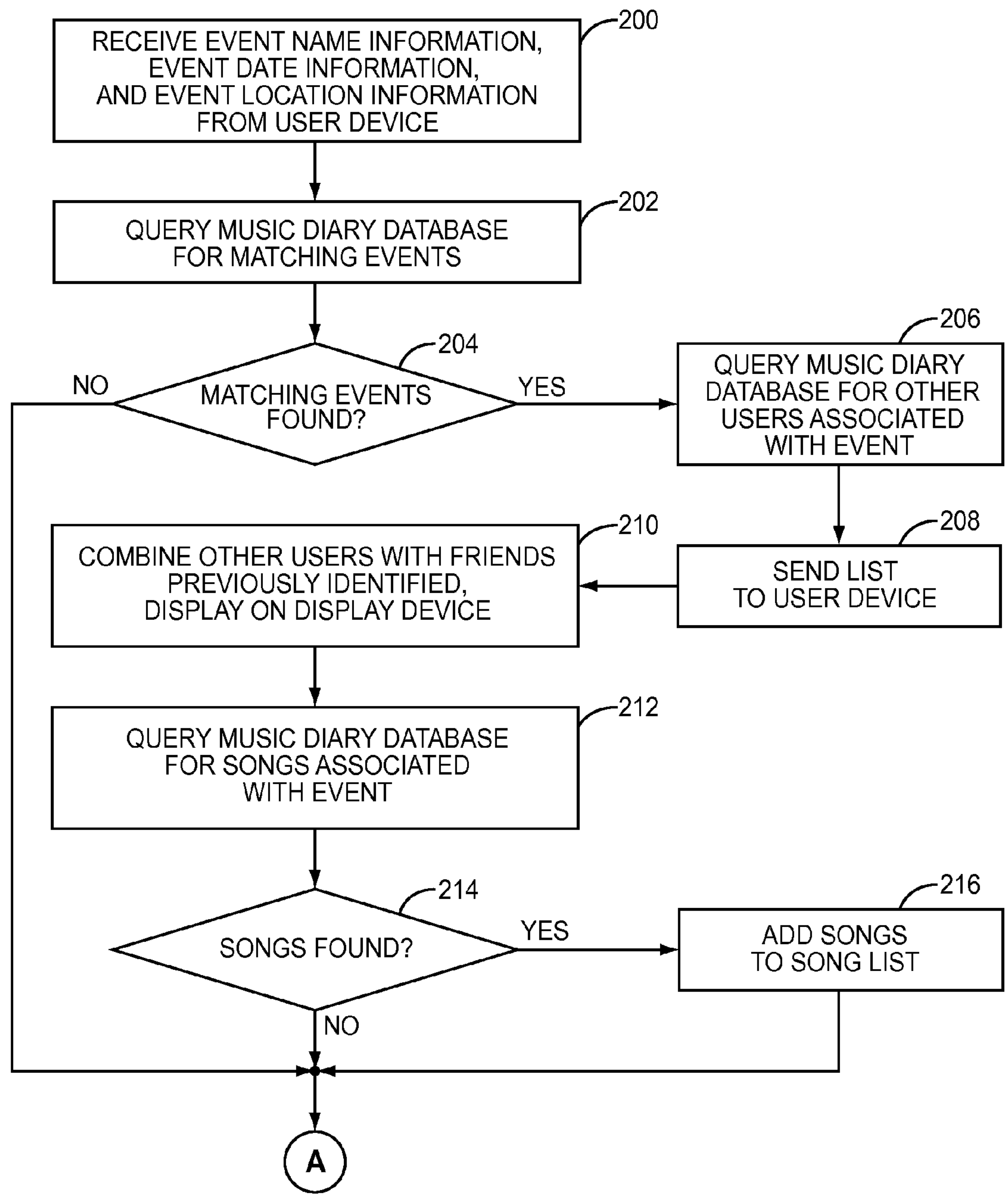
FIG. 5 shows a flow chart illustrating an exemplary process by which a music diary processor may use life event information entered by a user to obtain songs from other electronic music diaries according to one embodiment of the present invention.

FIG. 5 shows a flow chart illustrating an exemplary process by which the music diary processor 10 may use life event information entered by a user 24 to obtain songs from other electronic music diaries 40. The music diary processor 10 receives the event identifier information, the event date information, and event location information entered by the user 24 via the user interface 60 from the user device 20 (step 200). The music diary processor 10 queries the music diary database 14 to determine whether the music diary database 14 contains electronic music diaries 40 of other users 24 that include a life event that matches such information (step 202). By "matching" it is meant that the music diary processor 10 may determine whether any event identifiers 48 exist in the music diary database 14 that are identical, or substantially identical, to the data provided by the user 24 in the event identifier field 62. Notably, two different users 24 may have attended the same life event, such as, for example, the "Lynbrook High School Senior Prom" life event, but may have provided event identifiers 48 that differ to some extent. For example, a first user 24 may have described the life event as the "Lynbrook High School Senior Prom" while the second user 24 may have described the life event as "High School Senior Prom—Lynbrook." The music diary processor 10 preferably utilizes a matching algorithm that is capable of parsing through event identifiers 48 and providing, with a relatively high certainty, an indication that two life event identifiers that may not be identical are substantially similar such that they are likely the same life event. Other information, such as the event data information and event location information, may be similarly compared to aid in the matching determination. If any such matching life events are found (step 204), then the music diary processor 10 may query the music diary database 14 to obtain the user identifiers 54 of all other users 24 associated with the matching life events (step 206). The music diary processor 10 may provide the user identifiers 54 to the user device 20 (step 208). The user device 20 can combine the user identifiers 54 with the friends known to the user 24 and display a combined list of the user identifiers in the friends menu 80 (step 210). The music diary processor 10 can also query the music diary database 14 to determine all song identifiers 50 associated with the matching life event (step 212). If songs exist (step 214), the music diary processor 10 can add the songs to a song list that is developed by the music diary processor 10 and which will ultimately be provided to the user device 20 for display in the user library menu 88 (step 216).

Figure 6:
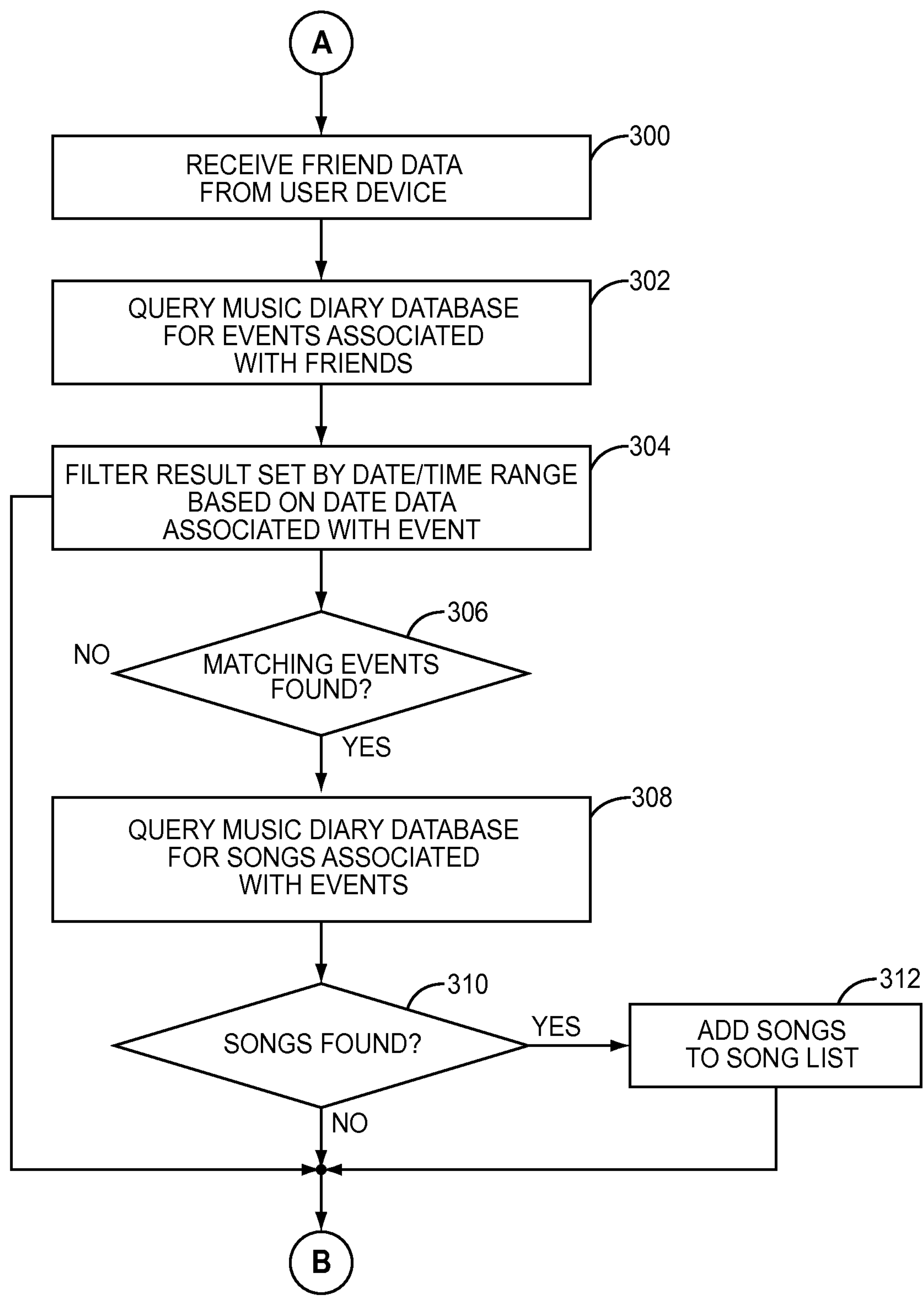
FIG. 6 shows a flow chart illustrating an exemplary process by which a music diary processor may use life event information entered by a user to obtain songs from other electronic music diaries according to another embodiment of the present invention.

FIG. 6 shows a flow chart illustrating an exemplary process by which the music diary processor 10 may use life event information entered by a user 24 to obtain songs from other electronic music diaries 40, according to one embodiment of the present invention. The music diary processor 10 receives the names of friends, i.e., user identifiers 54, selected by the user 24 and moved to the selected friends menu 82, from the user device 20 (step 300). The music diary processor 10 queries the music diary database 14 for all life events associated with the user identifiers 54 (step 302). Based on an amount of data that may be returned by the music diary database 14, the music diary processor 10 may filter the result set returned from the query of the music diary database 14 by a date and time range based on the date identifier 52 from the date field 64 of the user interface 60 (step 304). Assuming matching events are found (step 306), the music diary processor 10 may query the music diary database 14 for all songs associated the matching life events (step 308). If any songs are found (step 310), the songs may be added to the song list, which will be ultimately be provided for display to the user 24 (step 312).

Figure 7:
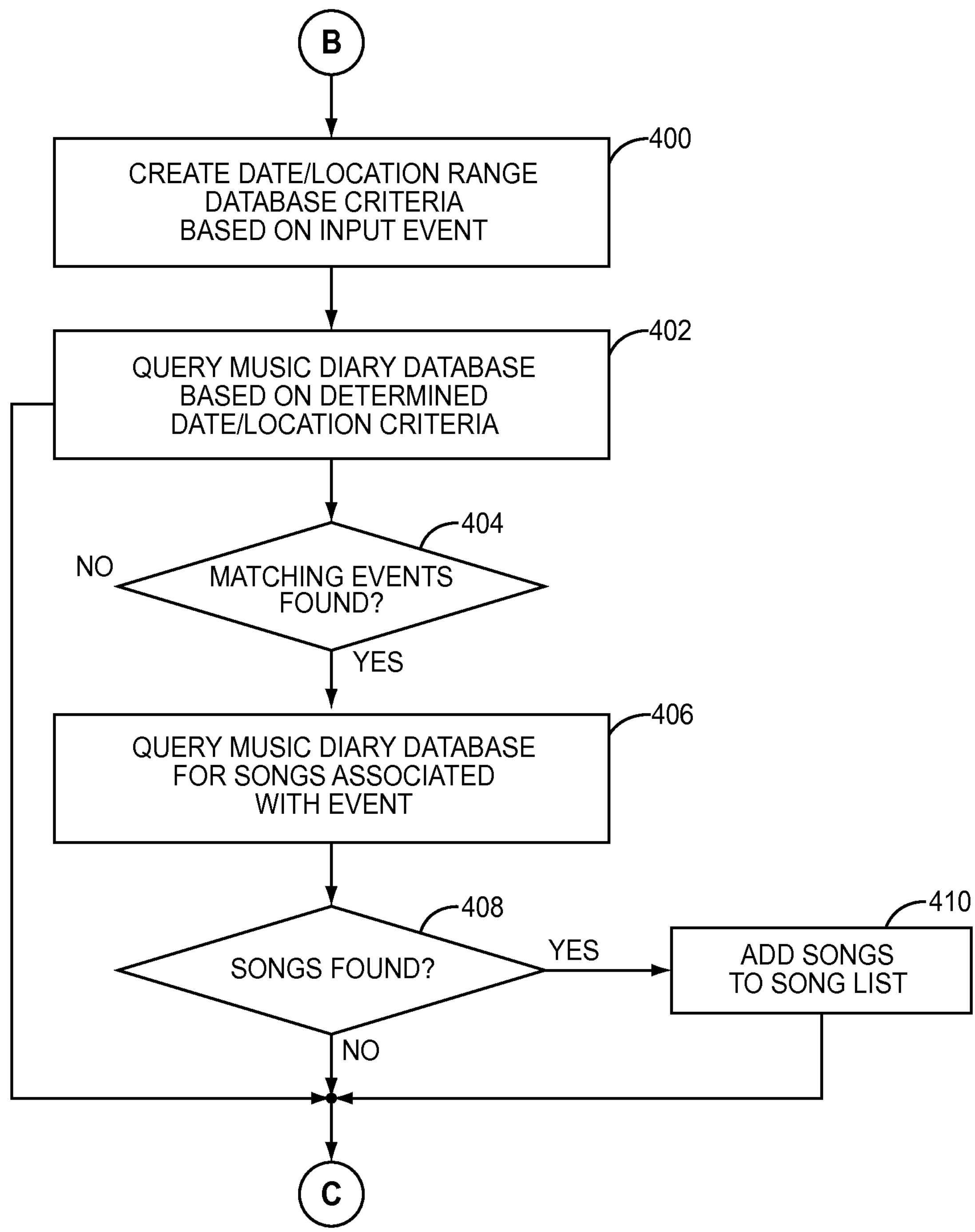
FIG. 7 shows a flow chart illustrating an exemplary process by which a music diary processor may use life event information entered by a user to obtain songs from other electronic music diaries according to an additional embodiment of the present invention.

FIG. 7 shows a flow chart illustrating an exemplary process wherein the music diary processor 10 may obtain songs from the music diary database 14 for display to the user 24 based on date and location information entered into the user interface 60 by the user 24. The music diary processor 10 may determine a particular date range based on the date information entered by the user 24 in the date field 64, and may also determine a range of locations based on the location information entered by the user 24 in the location box 66 (step 400). Such information may comprise, for example, a particular zip code and a radius defined by a certain number of miles surrounding the zip code. The music diary processor 10 may query the music diary database 14 with the date and location information to determine whether any matching life events exist in any users' electronic music diaries 40 within the date and location ranges (step 402). Matching life events in this context may mean any life events in any user's 24 electronic music diary 40 that occur within the specified date and/or location ranges. If such a matching life event is found (step 404), the music diary processor 10 may query the music diary database 14 to determine if there are any songs associated with the matching life events (step 406). If songs are found (step 408), the songs may be added to the song list that will ultimately be provided to the user device 20 for display to the user 24 (step 410).

Figure 8:
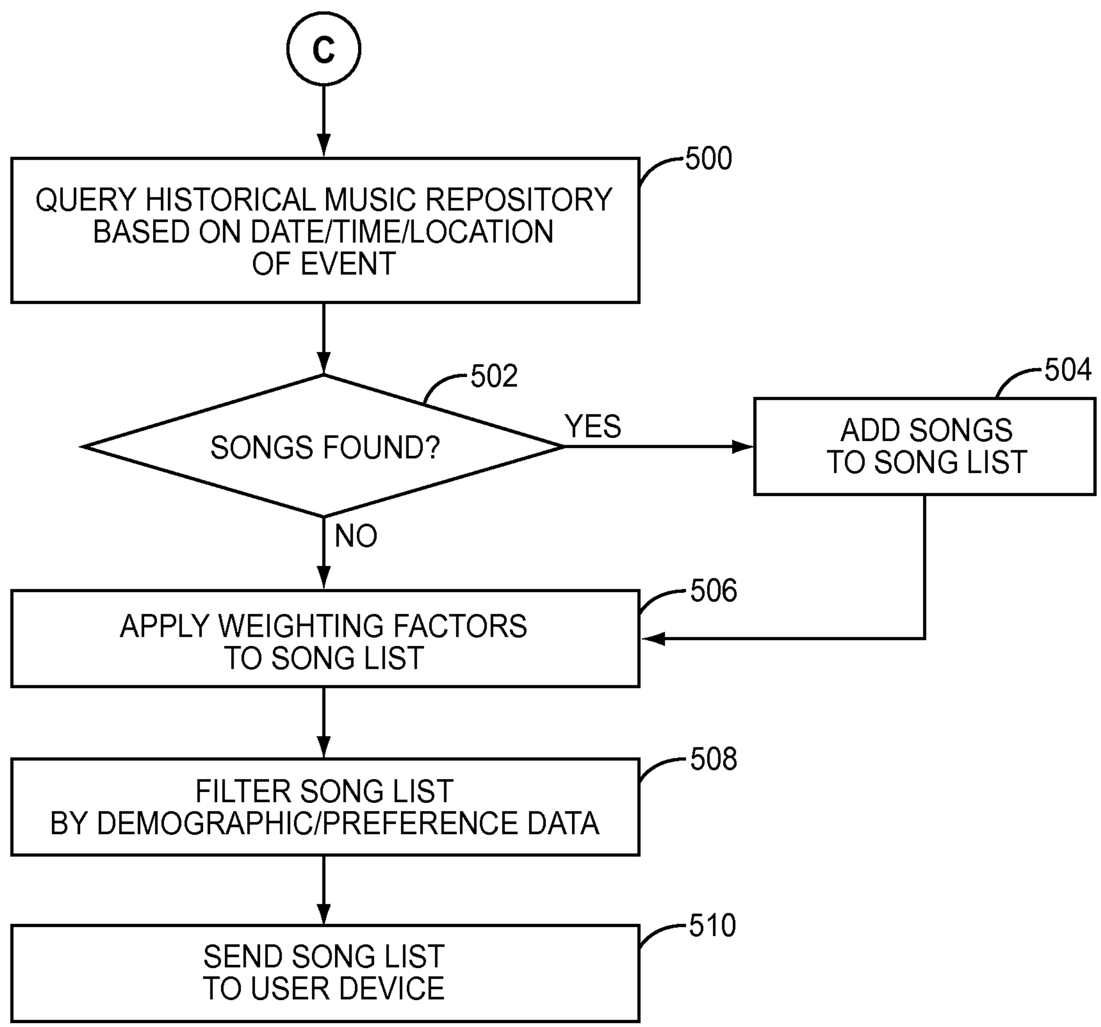
FIG. 8 shows a flow chart illustrating an exemplary process by which the music diary processor may use life event information entered by a user to obtain songs from the historical music repository of FIG. 1.

FIG. 8 shows a flow chart illustrating an exemplary process by which the music diary processor 10 may obtain songs from the historical music repository 32 of FIG. 1 for display to a user 24 in association with a respective life event. The music diary processor 10 may query the historical music repository 32 based on date and location information entered by the user 24 in the user interface 60 (step 500). If any songs are located in the historical music repository 32 based on the date and/or location information (step 502), the songs can be added to the song list that will be provided to the user device 20 for display to the user 24 (step 504).

The music diary processor 10 may then apply weighting factors to the combined song list in order to prioritize the combined list of songs generated via the processes illustrated in FIGS. 5 through 8 based on the particular matching algorithm used to find the song, as explained in greater detail when discussing FIG. 11 below (step 506). The songs may then, if desired, be further filtered based on demographics, other suitable criteria, or preference data that may be associated with the respective user 24 and maintained in the subscriber data 16 (step 508). The music diary processor 10 may then send the compiled song list to the user device 20, wherein the compiled song list may be presented to the user 24 in the user library menu 88 (step 510).

According to one embodiment of the present invention, the music diary processor 10 may use a filter to limit the database result sets for queries of the music diary database 14. Such filters may be desirable where a large number of users 24 have generated electronic music diaries 40 that are stored in the music diary database 14. For example, if hundreds of users 24 all have recorded in a respective electronic music diary 40 the same life event, a query issued by the music diary processor 10 may return hundreds of songs associated with the life event. Presenting hundreds of songs to a respective user 24 who is building or otherwise modifying an electronic music diary 40 may not be as useful to the user 24 as returning a smaller subset of the songs.

According to one embodiment, a date filter uses a one-dimensional Gaussian curve to establish a boundary time for a query of the music diary database 14 as well as an internal weighting factor for any songs that match the query. Within such boundaries, the height of the curve is used as a weighting factor between zero (low relevance) and one (high relevance). Outside of the boundaries, the relevance factor is zero. The point at which the curve meets the axis (zero crossing) defines the database query criteria. No database records need to be retrieved for times beyond this point, because such records would have a zero relevance factor.

Figure 9:
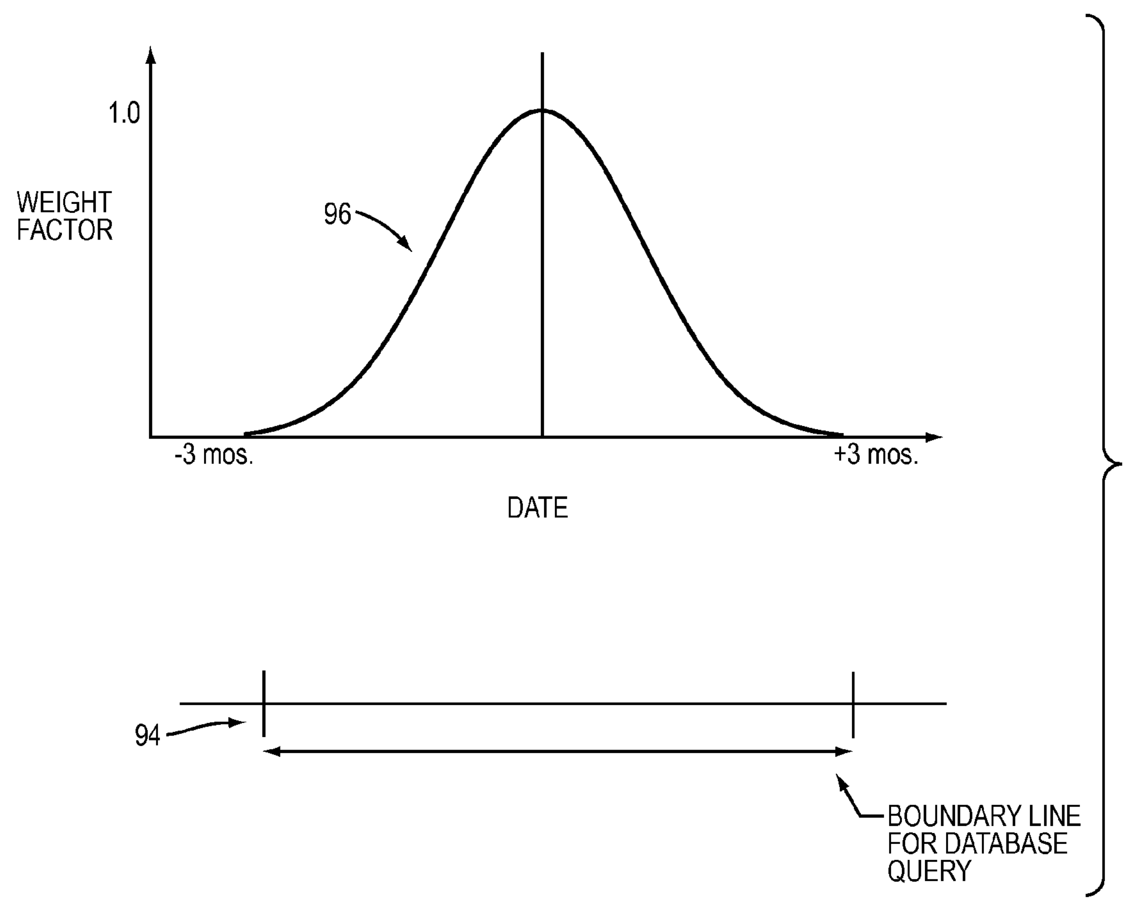
FIG. 9 shows a one-dimensional Gaussian curve for defining an exemplary boundary line and weight factor for an exemplary database query with one parameter, such as date and/or time.

FIG. 9 illustrates a boundary line 94 and a weight factor 96 derived from date information associated with a particular life event and used to generate an exemplary database query. The particular database query exemplified in FIG. 9 may be based on a Structured Query Language (SQL) query for all life events occurring around 5/8/2008 in accordance with the following query:

```
SELECT*FROM event
WHERE eventDate<='08-08-2008'
AND eventDate>='02-08-2008'
```

Thus, referring again to FIG. 9, the boundary line 94 shows that the range of dates is approximately plus and minus three months from the date of a life event occurring on 5/8/2008. The extent of the boundary line 94 may be determined, for example, by a system tunable parameter, or determined heuristically by a system over time based on users' selection of life events from query results. Alternately, it could be a user definable parameter, e.g., a user may know they are only interested in viewing life events of other users that occurred within two months of their own respective life event.

Figure 10:
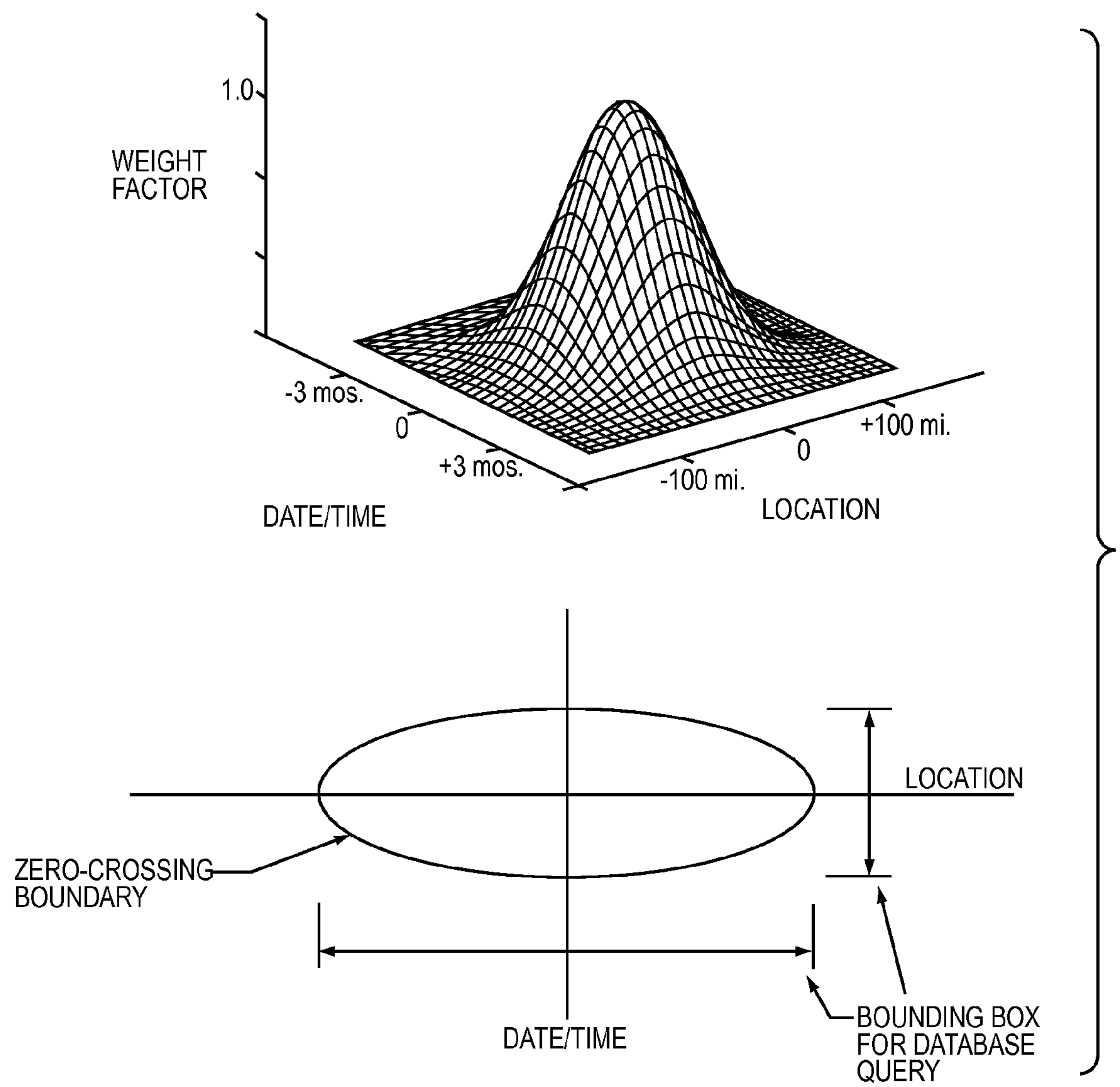
FIG. 10 shows a two-dimensional Gaussian curve for defining an exemplary boundary line and weight factor for a database query with two parameters, such as date/time and location.

FIG. 10 illustrates a two-dimensional Gaussian curve similar to that shown in FIG. 9, wherein the filter is based on both date and location information. In FIG. 10, the range of dates is the same as shown with respect to FIG. 9, e.g., plus and minus three months, and the location range is determined to be plus and minus 100 miles from the location of the life event. The range of plus and minus 100 miles is based on a zero crossing boundary illustrated in FIG. 10. Again, the location range could be a system tunable parameter, or determined heuristically by the system over time based on users' selection of life events from query results. Alternately, it could be a user definable parameter.

As mentioned with respect to FIG. 8, the music diary processor 10 may weight the songs obtained from querying the music diary database 14 such that songs may be displayed to the user 24 in an order from a highest priority to a lowest priority based on the matching algorithm used by the music diary processor 10 to obtain the songs. One mechanism for such weighting is illustrated in FIG. 11. A table 100 illustrates a prioritization, or weight factor, wherein an exact life event match is given a priority of eight, an implicit life event match via user identifiers 54 is given a weight factor of four, an implicit life event match via a location or time is given a weight factor of two, and an implicit life event match via historical data is given a weight factor of one. It will be apparent to those skilled in the art that the table 100 is merely an exemplary mechanism for providing a weighting factor to the results from the music diary database 14, and any suitable weighting factor may be used with the present invention.

Figure 12:
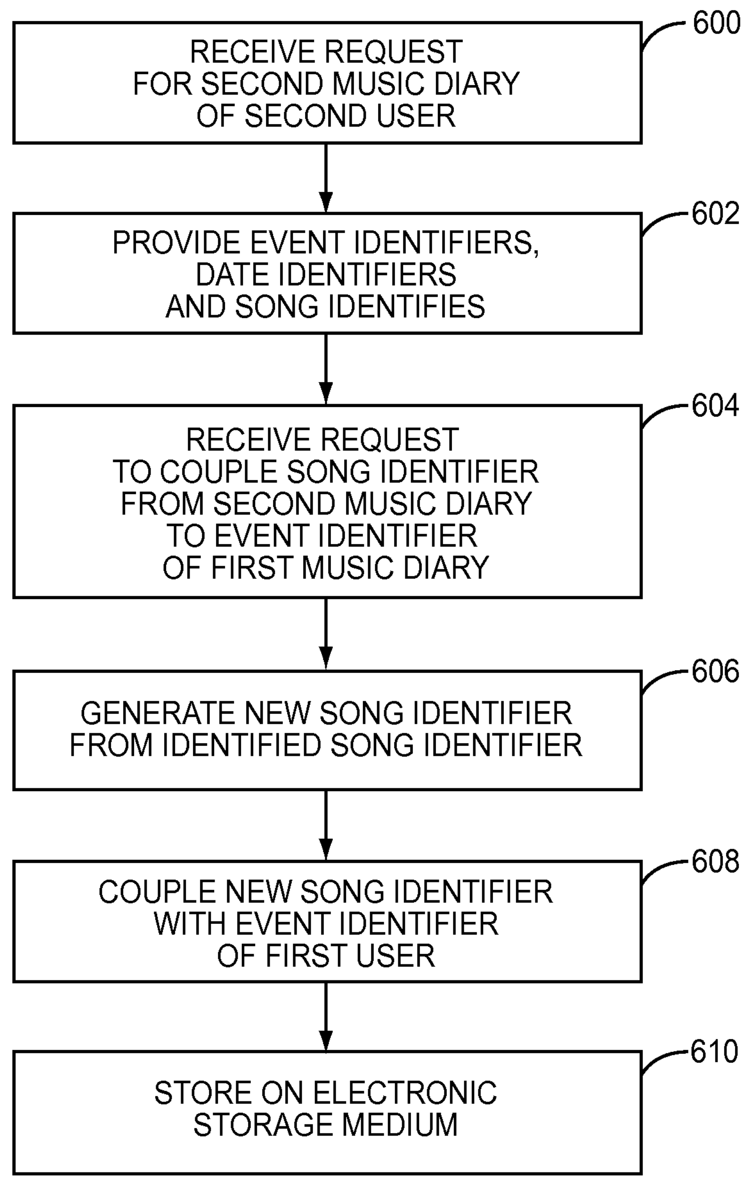
FIG. 12 shows a flow chart illustrating an exemplary process by which a first user may view an electronic music diary of a second user.

According to one embodiment, during generation of an electronic music diary 40, a user 24 may request to view the electronic music diary 40 of another user 24. FIG. 12 is a flow chart illustrating an exemplary process by which a first user 24 may view an electronic music diary 40 of a second user 24 for purposes of music discovery. The music diary processor 10 receives a request from the first user 24 via a respective user device 20 to view a second electronic music diary 40 of a second user 24 (step 600). The music diary processor 10 retrieves from the music diary database 14 the event identifiers 48, song identifiers 50, and date identifiers 52 associated with the second electronic music diary 40 of the second user 24 (step 602). The music diary processor 10 provides the information via the network 12 to the user device 20. The user device 20 provides such information in a chronological display similar or identical to that shown in FIG. 2 on the display 22 for the first user 24.

The first user 24 may view the electronic music diary 40 of the second user 24 and play one or more songs of the second electronic music diary 40. The first user 24 may decide that they would like to associate a particular song from the second electronic music diary 40 with a life event of the first user 24 in the first electronic music diary 40. The first user 24 indicates the selection to the user device 20, which in turn communicates the song identifier 50 from the second electronic music diary 40 to the music diary processor 10. The music diary processor 10 receives the request to couple the song identifier 50 from the second electronic music diary 40 to the event identifier 48 of the first electronic music diary 40 (step 604). The music diary processor 10 generates a new song identifier 50 from the identified song identifier 50 (step 606). The music diary processor 10 couples the new song identifier 50 with the event identifier 48 of the first electronic music diary 40 (step 608). The music diary processor 10 then stores the event identifier 48 and the new song identifier 50 in the music diary database 14, wherein the new song identifier 50 is coupled with the event identifier 48 (step 610).

Figure 13:
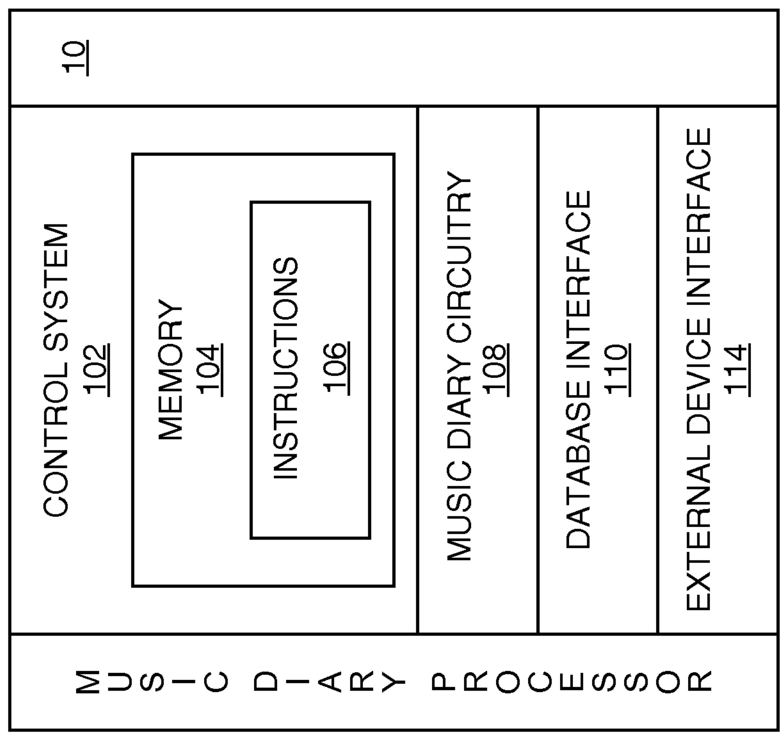
FIG. 13 shows a block diagram illustrating an exemplary music diary processor according to one embodiment of the present invention.

FIG. 13 is a block diagram illustrating the music diary processor 10 according to one embodiment of the present invention. The music diary processor 10 may include a control system 102 comprising a conventional or special purpose central processing unit that includes a memory 104 and instructions 106 for carrying out the functionality described herein. The music diary processor 10 may also be implemented as a special purpose machine, e.g., a particular machine that includes music diary circuitry 108, wherein functionality described herein is implemented in special purpose circuitry tailored and optimized for such purposes. The music diary processor 10 also includes a database interface 110 for communicating with the music diary database 14, and an external device interface 114 for communications with user devices 20.

Figure 14:
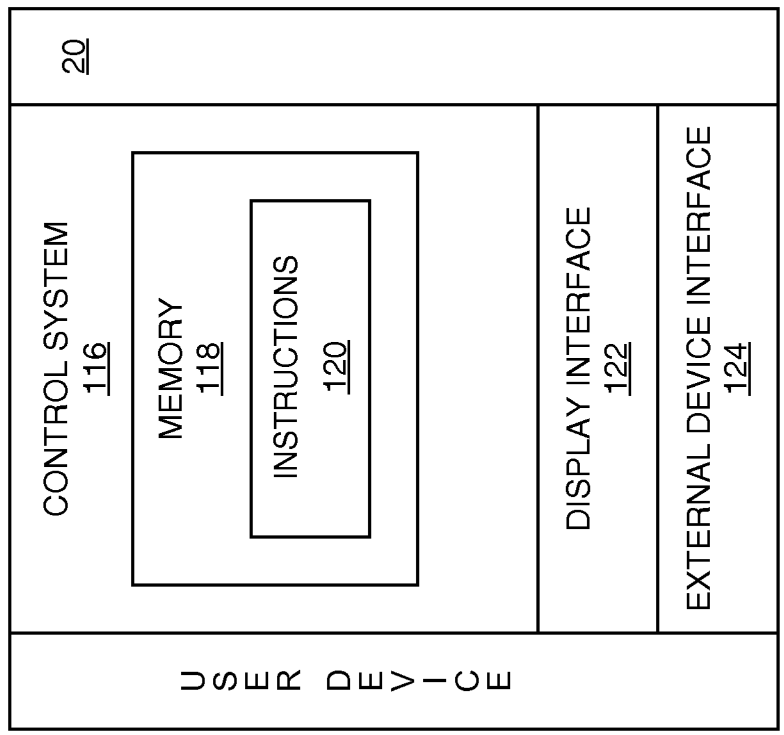
FIG. 14 shows a block diagram illustrating an exemplary user device according to one embodiment of the present invention.

FIG. 14 is a block diagram illustrating the user device 20 according to one embodiment of the present invention. The user device 20 may include a control system 116 comprising a special purpose or conventional central processing unit including a memory 118, wherein instructions 120 may be executed to carry out the functionality described herein. For example, the user device 20 may comprise a personal computer, or an Apple computer, programmed to provide the user interface 60 and functionality described herein. The user device 20 may include a display interface 122 for communicating with a respective display 22 in an external device interface 124 adapted to communicate with the music diary processor 10.

The present invention may be implemented in a computer program product comprising a computer readable medium having a computer readable program code embodied therein. The computer readable medium may comprise any electronic medium such as a compact disc (CD), a digital video disc (DVD), an electronic storage device, a flash memory, and the like.

Those skilled in the art will recognize improvements and modifications to the preferred embodiments of the present invention. All such improvements and modifications are considered within the scope of the concepts disclosed herein and the claims that follow.

What is claimed is:

1. A method for a music diary processor to generate a first electronic music diary comprising:

receiving a first plurality of event identifiers from a user device, wherein each event identifier identifies a respective life event associated with a life of a first user;

for each of the first plurality of event identifiers, receiving a first date identifier identifying a date associated with the life event;

for each of the first plurality of event identifiers, receiving a first song identifier identifying one or more songs identified by the first user as being associated with the life event;

generating the first electronic music diary by storing the first plurality of event identifiers, the first song identifiers, and the first date identifiers in an electronic storage medium wherein each first song identifier and each first date identifier is coupled with at least one respective first event identifier and the first plurality of event identifiers are coupled with each other;

receiving a request for a second electronic music diary;

identifying the second electronic music diary, wherein the second electronic music diary is associated with a second user different from the first user;

providing a second plurality of event identifiers associated with the second user, wherein each of the second plurality of event identifiers identifies a respective life event associated with a life of the second user;

associating the first electronic music diary with the second electronic music diary because at least one of the first plurality of event identifiers is substantially similar to at least one of the second plurality of event identifiers;

for at least one of the first plurality of event identifiers, receiving a first location identifier identifying a location associated with the life event, wherein each of the second plurality of event identifiers is coupled to a second location identifier that identifies a location within a predetermined distance of the location identified by the first location identifier;

obtaining from the electronic storage medium a plurality of second song identifiers, wherein each of the plurality of second song identifiers is coupled to at least one of the second plurality of event identifiers; and providing the plurality of second song identifiers to the user device.

2. A method for a music diary processor to generate a first electronic music diary comprising:

receiving a first plurality of event identifiers from a user device, wherein each event identifier identifies a respective life event associated with a life of a first user;

for each of the first plurality of event identifiers, receiving a first date identifier identifying a date associated with the life event;

for each of the first plurality of event identifiers, receiving a first song identifier identifying one or more songs identified by the first user as being associated with the life event;

generating the first electronic music diary by storing the first plurality of event identifiers, the first song identifiers, and the first date identifiers in an electronic storage medium wherein each first song identifier and each first date identifier is coupled with at least one respective first event identifier and the first plurality of event identifiers are coupled with each other;

receiving a request for a second electronic music diary;

identifying the second electronic music diary, wherein the second electronic music diary is associated with a second user different from the first user;

providing a second plurality of event identifiers associated with the second user, wherein each of the second plurality of event identifiers identifies a respective life event associated with a life of the second user;

associating the first electronic music diary with the second electronic music diary because at least one of the first plurality of event identifiers is substantially similar to at least one of the second plurality of event identifiers;

for at least one of the first plurality of event identifiers, receiving a first location identifier identifying a location associated with the life event, wherein each of the second plurality of event identifiers is coupled to a second location identifier that identifies a location within a predetermined distance of the location identified by the first location identifier and a second date identifier that identifies a date within a predetermined date range of the date identified by the first date identifier;

obtaining from the electronic storage medium a plurality of second song identifiers, wherein each of the plurality of second song identifiers is coupled to at least one of the second plurality of event identifiers; and providing the plurality of second song identifiers to the user device.

3. A music diary system having a hardware processor for generating an electronic music diary comprising:

a communications interface adapted to communicate with a network; and a control system coupled to the communications interface and adapted to:

receive a first plurality of event identifiers from a user device, wherein each event identifier identifies a respective life event associated with a life of a first user;

for each of the first plurality of event identifiers, receive a first date identifier identifying a date associated with the life event;

for each of the plurality of first event identifiers, receive a first song identifier identifying one or more songs identified by the first user as being associated with the life event;

store the first plurality of event identifiers, the first song identifiers, and the first date identifiers in an electronic storage medium wherein each first song identifier and first date identifier is coupled with at least one respective first event identifier and the plurality of first event identifiers are coupled with each other;

receive a request for a second electronic music diary associated with a second user different from the first user;

provide a second plurality of event identifiers associated with the second user, wherein each of the second plurality of event identifiers identifies a respective life event associated with a life of the second user; and associate the first electronic music diary with the second electronic music diary because at least one of the first plurality of event identifiers is substantially similar to at least one of the second plurality of event identifiers;

for at least one of the first plurality of event identifiers, receive a first location identifier identifying a location associated with the life event, wherein each of the second plurality of event identifiers is coupled to a second location identifier that identifies a location within a predetermined distance of the location identified by the first location identifier;

obtain from the electronic storage medium a plurality of second song identifiers, wherein each of the plurality of second song identifiers is coupled to at least one of the second plurality of event identifiers; and provide the plurality of second song identifiers to the user device.

4. A music diary system having a hardware processor for generating an electronic music diary comprising:

a communications interface adapted to communicate with a network; and a control system coupled to the communications interface and adapted to:

receive a first plurality of event identifiers from a user device, wherein each event identifier identifies a respective life event associated with a life of a first user;

for each of the first plurality of event identifiers, receive a first date identifier identifying a date associated with the life event;

for each of the plurality of first event identifiers, receive a first song identifier identifying one or more songs identified by the first user as being associated with the life event;

store the first plurality of event identifiers, the first song identifiers, and the first date identifiers in an electronic storage medium wherein each first song identifier and first date identifier is coupled with at least one respective first event identifier and the plurality of first event identifiers are coupled with each other;

receive a request for a second electronic music diary associated with a second user different from the first user;

provide a second plurality of event identifiers associated with the second user, wherein each of the second plurality of event identifiers identifies a respective life event associated with a life of the second user; and associate the first electronic music diary with the second electronic music diary because at least one of the first plurality of event identifiers is substantially similar to at least one of the second plurality of event identifiers;

for at least one of the first plurality of event identifiers, receive a first location identifier identifying a location associated with the life event, wherein each of the second plurality of event identifiers is coupled to a second location identifier that identifies a location within a predetermined distance of the location identified by the first location identifier and a second date identifier that identifies a date within a predetermined date range of the date identified by the first date identifier;

obtain from the electronic storage medium a plurality of second song identifiers, wherein each of the plurality of second song identifiers is coupled to at least one of the second plurality of event identifiers; and provide the plurality of second song identifiers to the user device.

* * * * *